United States Patent
Hill et al.

(10) Patent No.: US 10,234,539 B2
(45) Date of Patent: Mar. 19, 2019

(54) CYCLING REFERENCE MULTIPLEXING RECEIVER SYSTEM

(71) Applicant: Position Imaging, Inc., Portsmouth, NH (US)

(72) Inventors: Edward L. Hill, Exeter, NH (US); Mark Schneider, Williston, VT (US)

(73) Assignee: POSITION IMAGING, INC., Portsmouth, NH (US)

( * ) Notice: Subject to any disclaimer, the term of this patent is extended or adjusted under 35 U.S.C. 154(b) by 235 days.

(21) Appl. No.: 14/649,576

(22) PCT Filed: Dec. 16, 2013

(86) PCT No.: PCT/US2013/075277
§ 371 (c)(1),
(2) Date: Jun. 4, 2015

(87) PCT Pub. No.: WO2014/093961
PCT Pub. Date: Jun. 19, 2014

(65) Prior Publication Data
US 2015/0323643 A1    Nov. 12, 2015

Related U.S. Application Data

(60) Provisional application No. 61/737,770, filed on Dec. 15, 2012.

(51) Int. Cl.
*G01S 5/06* (2006.01)
*G01S 5/02* (2010.01)
(Continued)

(52) U.S. Cl.
CPC .............. *G01S 5/06* (2013.01); *G01S 5/0221* (2013.01); *H04B 7/0888* (2013.01); *H04B 17/27* (2015.01)

(58) Field of Classification Search
CPC .......... G01S 5/06; G01S 5/221; G01S 5/0205; G01S 5/0294; H01Q 3/24
See application file for complete search history.

(56) References Cited

U.S. PATENT DOCUMENTS 3,824,596 A * 7/1974 Guion ..................... G01S 3/143
                                                        342/434
3,940,700 A   2/1976 Fischer
(Continued)

FOREIGN PATENT DOCUMENTS

WO          2001006401 A1    1/2001

OTHER PUBLICATIONS

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

(Continued)

*Primary Examiner* — Cassi J Galt
(74) *Attorney, Agent, or Firm* — Schmeiser, Olsen & Watts LLP

(57) ABSTRACT

A position tracking system for tracking a physical location of a radio frequency (RF) transmitter comprises at least four RF receiver antennae at known locations. Each receiver antenna receives RF signals from the RF transmitter. One receiver antenna is used as a reference antenna. A receiver channel unit is in communication with the RF receiver antennae. The receiver channel unit comprises a reference receiver channel and a measurement receiver channel. A multiplexer is dynamically configurable to selectively connect the reference receiver channel to the reference receiver antenna and to connect, in succession, each other receiver antenna to the measurement receiver channel. A comparator measures phase differences between the RF signals received (Continued)

by the reference antenna and those received by each other receiver antennae. A data processor computes the physical location of the RF transmitter from the phase differences measured by the comparator and the known locations of the receiver antennae.

18 Claims, 5 Drawing Sheets

(51) Int. Cl.
  *H04B 7/08* (2006.01)
  *H04B 17/27* (2015.01)

(56) References Cited

U.S. PATENT DOCUMENTS

| | | | |
|---|---|---|---|
| 4,328,499 A * | 5/1982 | Anderson | G01S 3/46 342/444 |
| 5,010,343 A | 4/1991 | Andersson | |
| 5,343,212 A * | 8/1994 | Rose | G01S 11/04 342/424 |
| 5,426,438 A | 6/1995 | Peavey et al. | |
| 5,510,800 A | 4/1996 | McEwan | |
| 5,574,468 A | 11/1996 | Rose | |
| 5,592,180 A * | 1/1997 | Yokev | G01S 1/026 342/446 |
| 5,600,330 A | 2/1997 | Blood | |
| 5,657,026 A * | 8/1997 | Culpepper | H01Q 3/24 342/101 |
| 5,923,286 A | 7/1999 | Divakaruni | |
| 5,953,683 A | 9/1999 | Hansen et al. | |
| 6,167,347 A | 12/2000 | Lin | |
| 6,255,991 B1 * | 7/2001 | Hedin | G01S 3/48 342/424 |
| 6,292,750 B1 | 9/2001 | Lin | |
| 6,409,687 B1 | 6/2002 | Foxlin | |
| 6,412,748 B1 | 7/2002 | Girard | |
| 6,417,802 B1 | 7/2002 | Diesel | |
| 6,496,778 B1 | 12/2002 | Lin | |
| 6,593,885 B2 | 7/2003 | Wisherd et al. | |
| 6,630,904 B2 | 10/2003 | Gustafson et al. | |
| 6,683,568 B1 | 1/2004 | James et al. | |
| 6,697,736 B2 | 2/2004 | Lin | |
| 6,721,657 B2 | 4/2004 | Ford et al. | |
| 6,750,816 B1 | 6/2004 | Kunysz | |
| 6,861,982 B2 | 3/2005 | Forstrom | |
| 6,989,789 B2 * | 1/2006 | Ferreol | G01S 3/043 342/374 |
| 7,009,561 B2 | 3/2006 | Menache | |
| 7,143,004 B2 | 11/2006 | Townsend et al. | |
| 7,168,618 B2 | 1/2007 | Schwartz | |
| 7,190,309 B2 | 3/2007 | Hill | |
| 7,193,559 B2 | 3/2007 | Ford et al. | |
| 7,236,092 B1 | 6/2007 | Kiang et al. | |
| 7,292,189 B2 | 11/2007 | Orr | |
| 7,295,925 B2 | 11/2007 | Breed et al. | |
| 7,409,290 B2 | 8/2008 | Lin | |
| 7,443,342 B2 | 10/2008 | Shirai et al. | |
| 7,499,711 B2 | 3/2009 | Hoctor et al. | |
| 7,533,569 B2 | 5/2009 | Sheynblat | |
| 7,612,715 B2 * | 11/2009 | Macleod | G01S 3/043 342/432 |
| 7,646,330 B2 | 1/2010 | Karr | |
| 7,868,760 B2 | 1/2011 | Smith et al. | |
| 7,876,268 B2 | 1/2011 | Jacobs | |
| 8,269,624 B2 | 9/2012 | Chen et al. | |
| 8,457,655 B2 | 6/2013 | Zhang et al. | |
| 8,749,433 B2 | 6/2014 | Hill | |
| 8,957,812 B1 | 2/2015 | Hill et al. | |
| 9,063,215 B2 | 6/2015 | Perthold et al. | |
| 9,120,621 B1 | 9/2015 | Curlander | |
| 9,482,741 B1 | 11/2016 | Min | |
| 9,497,728 B2 | 11/2016 | Hill | |
| 9,519,344 B1 | 12/2016 | Hill | |
| 9,782,669 B1 | 10/2017 | Hill | |
| 9,933,509 B2 | 4/2018 | Hill et al. | |
| 9,961,503 B2 | 5/2018 | Hill | |
| 10,001,833 B2 | 6/2018 | Hill | |
| 2002/0021277 A1 | 2/2002 | Kramer | |
| 2002/0140745 A1 | 10/2002 | Ellenby | |
| 2003/0053492 A1 | 3/2003 | Matsunaga | |
| 2003/0120425 A1 | 6/2003 | Stanley et al. | |
| 2003/0195017 A1 | 10/2003 | Chen et al. | |
| 2004/0095907 A1 | 5/2004 | Agee et al. | |
| 2004/0176102 A1 | 9/2004 | Lawrence et al. | |
| 2004/0203846 A1 | 10/2004 | Carronni et al. | |
| 2005/0143916 A1 | 6/2005 | Kim et al. | |
| 2005/0184907 A1 | 8/2005 | Hall | |
| 2005/0275626 A1 | 12/2005 | Mueller et al. | |
| 2006/0013070 A1 | 1/2006 | Holm et al. | |
| 2006/0061469 A1 | 3/2006 | Jaeger | |
| 2006/0066485 A1 | 3/2006 | Min | |
| 2006/0101497 A1 | 5/2006 | Hirt | |
| 2006/0279459 A1 | 12/2006 | Akiyama | |
| 2006/0290508 A1 | 12/2006 | Moutchkaev et al. | |
| 2007/0060384 A1 | 3/2007 | Dohta | |
| 2007/0138270 A1 | 6/2007 | Reblin | |
| 2007/0205867 A1 | 9/2007 | Kennedy et al. | |
| 2007/0210920 A1 | 9/2007 | Panotopoulos | |
| 2007/0222560 A1 | 9/2007 | Posamentier | |
| 2008/0048913 A1 | 2/2008 | Macias et al. | |
| 2008/0143482 A1 | 6/2008 | Shoarinejad et al. | |
| 2008/0154691 A1 | 6/2008 | Wellman et al. | |
| 2008/0204322 A1 | 8/2008 | Oswald et al. | |
| 2008/0316324 A1 | 12/2008 | Rofougaran | |
| 2009/0149202 A1 | 6/2009 | Hill et al. | |
| 2009/0243932 A1 | 10/2009 | Moshfeghi | |
| 2010/0090852 A1 | 4/2010 | Eitan et al. | |
| 2010/0103173 A1 | 4/2010 | Lee | |
| 2010/0103989 A1 | 4/2010 | Smith et al. | |
| 2010/0123664 A1 | 5/2010 | Shin | |
| 2011/0006774 A1 | 1/2011 | Balden | |
| 2011/0037573 A1 | 2/2011 | Choi | |
| 2011/0187600 A1 | 8/2011 | Landt | |
| 2011/0208481 A1 | 8/2011 | Slastion | |
| 2011/0210843 A1 | 9/2011 | Kummetz | |
| 2011/0241942 A1 | 10/2011 | Hill | |
| 2011/0256882 A1 | 10/2011 | Markhovsky | |
| 2012/0013509 A1 | 1/2012 | Wisherd et al. | |
| 2012/0127088 A1 | 5/2012 | Pance et al. | |
| 2012/0184285 A1 | 7/2012 | Sampath | |
| 2012/0286933 A1 | 11/2012 | Hsiao | |
| 2012/0319822 A1 | 12/2012 | Hansen | |
| 2013/0021417 A1 | 1/2013 | Miho et al. | |
| 2013/0036043 A1 | 2/2013 | Faith | |
| 2013/0314210 A1 | 11/2013 | Schoner | |
| 2014/0253368 A1 | 9/2014 | Holder | |
| 2014/0300516 A1 | 10/2014 | Min et al. | |
| 2014/0361078 A1 | 12/2014 | Davidson | |
| 2015/0009949 A1 | 1/2015 | Khoryaev et al. | |
| 2015/0039458 A1 | 2/2015 | Reid | |
| 2015/0091757 A1 | 4/2015 | Shaw et al. | |
| 2015/0130664 A1 | 5/2015 | Hill | |
| 2015/0169916 A1 | 6/2015 | Hill | |
| 2015/0221135 A1 | 8/2015 | Hill | |
| 2015/0362581 A1 | 12/2015 | Friedman | |
| 2015/0379366 A1 | 12/2015 | Nomura | |
| 2016/0142868 A1 | 5/2016 | Kulkarni et al. | |
| 2016/0156409 A1 | 6/2016 | Chang | |
| 2016/0178727 A1 | 6/2016 | Bottazzi | |
| 2016/0238692 A1 | 8/2016 | Hill | |
| 2016/0256100 A1 | 9/2016 | Jacofsky et al. | |
| 2016/0286508 A1 | 9/2016 | Khoryaev et al. | |
| 2016/0366561 A1 | 12/2016 | Min et al. | |
| 2016/0370453 A1 | 12/2016 | Boker et al. | |
| 2016/0371574 A1 | 12/2016 | Nguyen et al. | |
| 2017/0030997 A1 | 2/2017 | Hill | |
| 2017/0031432 A1 | 2/2017 | Hill | |
| 2017/0123426 A1 | 5/2017 | Hill | |
| 2017/0234979 A1 | 8/2017 | Mathews | |
| 2017/0323174 A1 | 11/2017 | Joshi et al. | |
| 2017/0350961 A1 | 12/2017 | Hill | |

(56) References Cited

U.S. PATENT DOCUMENTS

2017/0372524 A1  12/2017  Hill
2018/0231649 A1  8/2018  Min et al.
2018/0242111 A1  8/2018  Hill

OTHER PUBLICATIONS

International Preliminary Report on Patentability in counterpart International Patent Application No. PCT/US13/75277, dated Jun. 25, 2015; 7 pages.
Schmidt & Phillips, "INS/GPS Integration Architectures", NATO RTO Lecture Seriers, First Presented Oct. 20-21, 2003; 24 pages.
Farrell & Barth, "The Global Positiong System & Interial Navigation", 1999, McGraw-Hill; pp. 245-252.
Grewal & Andrews, "Global Positioning Systems, Inertial Nagivation, and Integration", 2001, John Weiley and Sons, pp. 252-256.
Jianchen Gao, "Development of a Precise GPS/INS/On-Board Vehicle Sensors Integrated Vehicular Positioning System", Jun. 2007, UCGE Reports No. 20555; 245 pages.
Yong Yang, "Tightly Coupled MEMS INS/GPS Integration with INS Aided Receiver Tracking Loops", Jun. 2008, UCGE Reports No. 20270; 205 pages.
Goodall, Christopher L., "Improving Usability of Low-Cost INS/GPS Navigation Systems using Intelligent Techniques", Jan. 2009, UCGE Reports No. 20276; 234 pages.
Debo Sun, "Ultra-Tight GPS/Reduced IMU for Land Vehicle Navigation", Mar. 2010, UCGE Reports No. 20305; 254 pages.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.
Adrian Schumacher, "Integration of a GPS aised Strapdown Inertial Navigation System for Land Vehicles", Master of Science Thesis, KTH Electrical Engineering, 2006; 67 pages.
Vikas Numar N., "Integration of Inertial Navigation System and Global Positioning System Using Kalman Filtering", M.Tech Dissertation, Indian Institute of Technology, Bombay, Mumbai, Jul. 2004; 69 pages.
Jennifer Denise Gautier, "GPS/INS Generalized Evaluation Tool (GIGET) for the Design and Testing of Integrated Navigation Systems", Dissertation, Stanford University, Jun. 2003; 160 pages.
Farrell, et al., "Real-Time Differential Carrier Phase GPS=Aided INS", Jul. 2000, IEEE Transactions on Control Systems Technology, vol. 8, No. 4; 13 pages.
Filho, et al., "Integrated GPS/INS Navigation System Based on a Gyrpscope-Free IMU", DINCON Brazilian Conference on Synamics, Control, and Their Applications, May 22-26, 2006; 6 pages.
Santiago Alban, "Design and Performance of a Robust GPS/INS Attitude System for Automobile Applications", Dissertation, Stanford University, Jun. 2004; 218 pages.
International Search Report and Written Opinion in related International Patent Application No. PCT/US12/64860, dated Feb. 28, 2013; 8 pages.
U.S. Appl. No. 13/918,295, filed Jun. 14, 2013, entitled, "RF Tracking with Active Sensory Feedback"; 31 pages.
U.S. Appl. No. 13/975,724, filed Aug. 26, 2013, entitled, "Radio Frequency Communication System" 22 pages.
Proakis, John G. and Masoud Salehi, "Communication Systems Engineering", Second Edition, Prentice-Hall, Inc., Upper Saddle River, New Jersey, 2002; 815 pages.
International Search Report and Written Opinion in International Patent Application No. PCT/US13/75277, dated Apr. 7, 2014; 7 pages.
"ADXL202/ADXL210 Product Sheet," Analog Devices, Inc., Analog.com, 1999; 11 pages.
Li, Xin, et al. "Multifrequency-Based Range Estimation of RFID Tags," 2009, IEEE.
Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.
Wilde, Andreas, "Extended Tracking Range Delay-Locked Loop," Proceedings IEEE International Conference on Communications, Jun. 1995, pp. 1051-1054.

\* cited by examiner

CYCLING REFERENCE MULTIPLEXING RECEIVER SYSTEM

RELATED APPLICATION

This application claims the benefit of and priority to U.S. provisional application No. 61/737,770, filed Dec. 15, 2012, titled "Cycling Reference Multiplexing Receiver System," the entirety of which is incorporated by reference herein.

FIELD OF THE INVENTION

The invention relates generally to systems and methods of radio frequency (RF) communication. More particularly, the invention relates to systems and methods for tracking the position of RF transmitting devices.

BACKGROUND

A commonly used method to track the position of a radio signal-emitting tracked device is to use the time difference of arrival (or, equivalently, the phase difference of arrival) at various receivers or receiver antennae at known locations to determine the position of the tracked device. By solving the non-linear equations that arise with such systems, the position of the tracked device can be determined. Because phase ($\theta$) and time (t) are related by $\theta = \omega t$, where $\omega$ is a radio frequency scalar, they are equivalent systems and subsequent descriptions are denoted by time or time differences, as appropriate.

SUMMARY

All examples and features mentioned below can be combined in any technically possible way.

In one aspect, the invention features a position tracking system for tracking a physical location of a radio-frequency (RF) transmitter. The position tracking system comprises at least four RF receiver antennae disposed at known locations. Each of the RF receiver antennae receives RF signals from an RF transmitter. One of the RF receiver antennae is used as a reference RF receiver antenna. A receiver channel unit is in communication with the at least four RF receiver antennae. The receiver channel unit comprises a plurality of receiver channels including a reference receiver channel and a measurement receiver channel. The receiver channel unit further comprises a multiplexer dynamically configurable to selectively connect the reference receiver channel to the reference RF receiver antenna and to connect, in succession, each of the other RF receiver antennae to the measurement receiver channel. A comparator circuit measures phase differences between the RF signals received by the reference RF receiver antenna and the RF signals received by each of the other RF receiver antennae. A data processor computes the physical location of the RF transmitter from the phase differences measured by the comparator circuit and the known locations of the at least four RF receiver antennae.

Embodiments of the position tracking system may include one of the following features, or any combination thereof.

The multiplexer of the position tracking system can be dynamically configurable to connect the reference receiver channel to a different one of the four RF receiver antennae, to select thereby a new reference RF receiver antenna. The multiplexer can include a first switching circuit and a second switching circuit. The first switching circuit is adapted to connect any one of the RF receiver antennae to the measurement receiver channel, and the second switching circuit is adapted to connect any one of the RF receiver antennae to the reference receiver channel. The data processor can be in communication with the multiplexer to control which of the RF receiver antennae the multiplexer connects to the reference receiver channel. The comparator circuit can compute a time difference of arrival between RF signals received by the reference RF receiver antenna and RF signals received by each of the other RF receiver antennae and forward the time difference of arrival computations to the data processor for computation of the physical location of the RF transmitter. The receiver channel unit can comprise the data processor.

In another aspect, the invention features a radio frequency (RF) receiver channel unit for tracking a physical location of an RF transmitter. The RF receiver channel unit comprises a reference receiver channel including a RF receiver and demodulator, a measurement receiver channel including a RF receiver and demodulator, and a multiplexer dynamically configurable to selectively connect the reference receiver channel to a reference RF receiver antenna and to connect, in succession, each of at least three other RF receiver antennae to the measurement receiver channel. The RF receiver and demodulator of the reference receiver channel receives and demodulates RF signals transmitted by the RF transmitter and received by the reference RF receiver antenna; the RF receiver and demodulator of the measurement receiver channel, in succession, receives and demodulates RF signals transmitted by the RF transmitter and received by each of the at least three other RF receiver antennae. The RF receiver channel unit further comprises a comparator circuit measuring phase differences between the RF signals received by the reference RF receiver antenna and the RF signals received by each of the three other RF receiver antennae.

Embodiments of the RF receiver channel unit may include one of the following features, or any combination thereof.

The RF receiver channel unit can further comprise a data processor computing the physical location of the RF transmitter from the phase differences measured by the comparator circuit and known locations of the RF receiver antennae. The multiplexer can be dynamically configurable to connect the reference receiver channel to any of the at least three other RF receiver antennae, to select thereby a new reference RF receiver antenna. The multiplexer can include a first switching circuit and a second switching circuit, the first switching circuit being adapted to connect any one of the RF receiver antennae to the measurement receiver channel, and the second switching circuit being adapted to connect any one of the RF receiver antennae to the reference receiver channel. The data processor can communicate with the multiplexer to cause the first switching circuit to connect, in succession, each of the at least three other receiver antennae to the measurement receiver channel, while the second switching circuit connects to the reference receiver antenna to the reference receiver channel. The data processor can be in communication with the multiplexer to control which of the RF receiver antennae the multiplexer connects to the reference receiver channel. The comparator circuit can compute a time difference of arrival between the RF signals received by the reference RF receiver antenna and the RF signals received by each of the at least three other RF receiver antennae and forward the time difference of arrival computations to the data processor for computation of the physical location of the RF transmitter.

In still another aspect, the invention features a method for tracking a physical location of a radio frequency (RF) transmitter. The method comprises receiving RF signals from an RF transmitter by at least four RF receiver antennae disposed at known locations, dynamically selecting one of the at least four RF receiver antennae as a reference RF receiver antenna, connecting the selected reference RF receiver antenna to a reference receiver channel, connecting, one at a time, each of the other RF receiver antennae to a measurement receiver channel, measuring phase differences between the RF signals received by the reference RF receiver antenna and the RF signals received by each of the other RF receiver antennae, and computing the physical location of the RF transmitter from the measured phase differences and the known locations of the at least four RF receiver antennae.

Embodiments of the method may include one of the following features, or any combination thereof.

The method can further comprise dynamically selecting a new reference RF receiver antenna by disconnecting a current reference RF receiver antenna from the reference receiver channel and connecting any of the at least three other RF receiver antennae to the reference receiver channel. The method can further comprise connecting, one at a time, each of the other RF receiver antennae to the measurement receiver channel, while connecting the reference receiver antennae to the reference receiver channel. A multiplexer can be controlled to select which of the at least four RF receiver antennae connects to the reference receiver channel. A time difference of arrival can be computed between the RF signals received by the reference RF receiver antenna and the RF signals received by each of the other RF receiver antennae; and the time difference of arrival computations can be forwarded to a data processor for computation of the physical location of the RF transmitter.

In yet another aspect, the invention features a radio frequency (RF) receiver channel unit for tracking a physical location of an RF transmitter. The RF receiver channel unit comprises means for receiving RF signals, issued by an RF transmitter, at four or more known locations, means for dynamically selecting the RF signal-receiving means at one of the known locations as a reference receiver; and means for connecting the selected reference receiver to a reference receiver channel. The RF receiver channel unit further comprises means for connecting, one at a time, the RF signal-receiving means at each of the other three know locations to a measurement receiver channel, means for measuring phase differences between the RF signals received by the reference receiver channel and the RF signals received by the measurement receiver channel, and means for computing the physical location of the RF transmitter from the measured phase differences and the four or more known locations of the RF signal-receiving means.

Embodiments of the RF receiver channel unit may include one of the following features, or any combination thereof.

The RF receiver channel unit may include means for dynamically selecting a new reference receiver by disconnecting a current reference receiver from the reference receiver channel and connecting the RF-signal receiving means at any of the at least three other known locations to the reference receiver channel. The RF receiver channel unit may include means for connecting, one at a time, each of the RF-signal receiving means at any of the at least three other known locations to the measurement receiver channel, while connecting the reference receiver to the reference receiver channel. The RF receiver channel unit may include means for controlling which of the RF signal-receiving means to connect to the reference receiver channel. The RF receiver channel unit may include means for computing a time difference of arrival between the RF signals received by the reference receiver channel and the RF signals received by the measurement receiver channel and means for forwarding the time difference of arrival computations to the means for computing the physical location of the RF transmitter.

DETAILED DESCRIPTION

Figure 1:
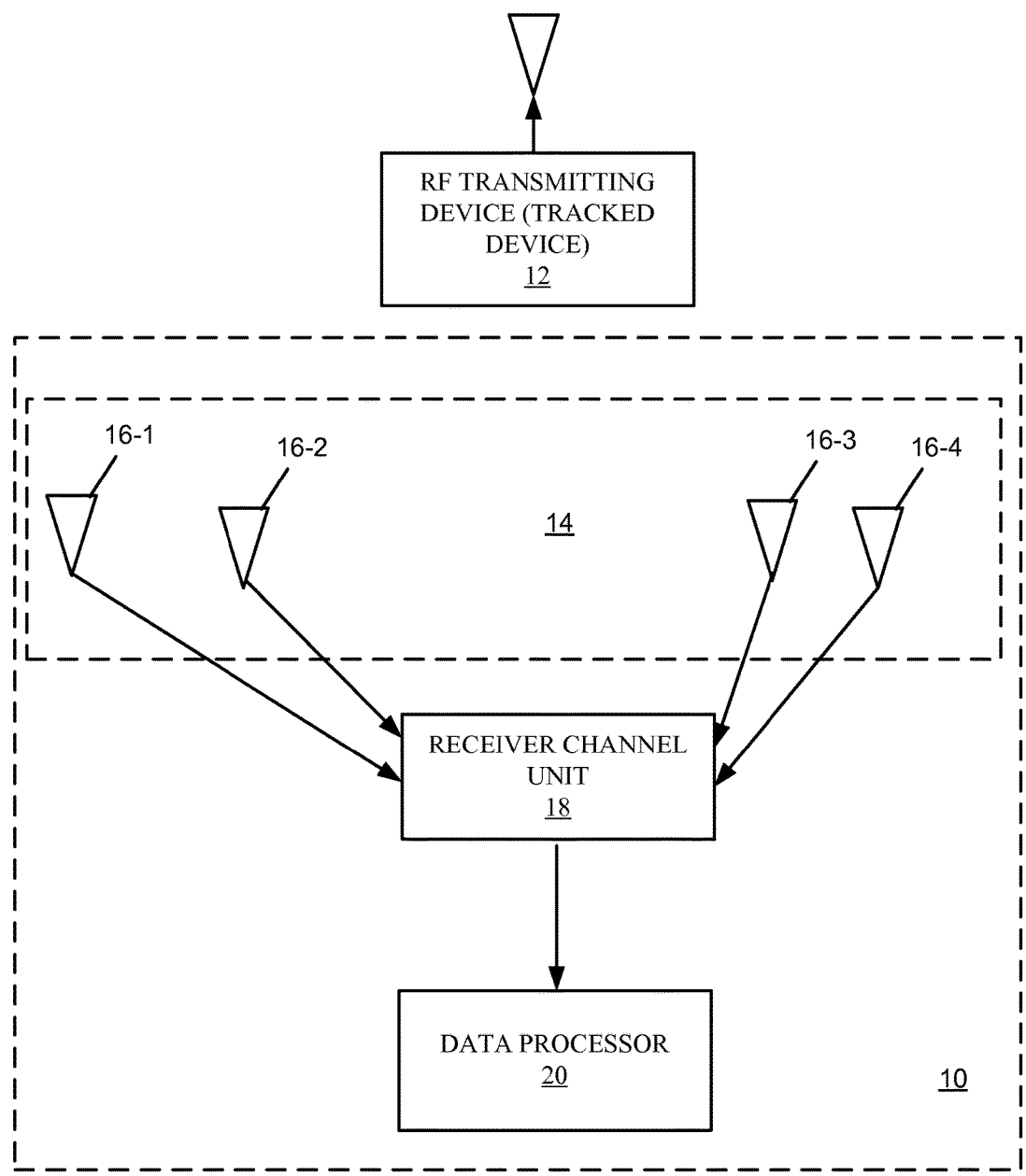
FIG. 1 is a block diagram of an embodiment of a position tracking system for tracking a position of an RF transmitter.

Certain computer-based applications that track the position of an interactive peripheral device (tracked device) and use that position data to engage a software program require high tracking accuracy. In these applications, the tracked device registers with screen images provided by software. To make the operation of the tracked device effective for a user (to control a cursor on a screen for example) very high position accuracies are required to provide realistic interaction between the user operating the tracked device and the software program. A signal time of arrival comparison approach for position tracking can provide higher accuracies. In some of these applications, however, low cost is imperative to be successful. For example, a system used to improve the interactive functionality of typical computer peripherals, such as computer mouse, game controllers, needs to be low cost.

The principles described herein can effectively reduce the cost of a position tracking system, in order to meet established or consumer-accepted price points of wireless network communication systems, by reducing the hardware requirements of the tracking system. Radio frequency (RF) communication systems employing these principles can track the physical position of wireless peripheral devices (e.g., computer mice, game controllers, and smartphones) that wirelessly communicate with the system using RF signals. In brief overview, such systems include a receiver network of four or more (for three dimensions) receiver antennae disposed at known physical locations. These receiver antennae receive radio transmissions from at least one wireless mobile transmitter, transceiver, or transducer (hereafter, "tracked device"). One or more of the receivers are connected to the receiver antennae through a switching circuit. A data processor computes the relative position of each tracked device through the time differences of arrival between a reference receiver antenna and each of the other receiver antennae for the RF signals transmitted by the tracked device. The data processor can compute the relative position of each tracked device in two or three-dimensional space by comparing the time of arrival at each receiver antenna with the reference receiver antenna and correlating those time differences with the known physical positions of all receiver antennae to determine the position of the tracked device.

For example, in a simple configuration for three-dimensional position tracking, a tracked device transmits an RF signal that is received by at least four receiver antennae. One of the receiver antennae, chosen by a data processor, acts as the reference antenna to compare the time difference of arrival of the RF signals of the tracked device with each of the three other receiver antennae, each referred to as a measurement antenna. This timing information and the known positions of the four receiver antennae enable the data processor, using simple triangulation techniques, to determine the physical position of the tracked device.

In one embodiment of a position tracking system that uses time difference of arrival for position detection, each receiver channel comprises a demodulator circuit (hereafter demodulator) that includes an amplifier connected to the antenna. If carrier recovery is required, a delay lock loop (DLL) can be utilized to perform the carrier recovery function. One receiver channel is used as a reference channel, while each other receiver channel is a "measurement" channel. The reference antenna gets connected to the reference receiver channel; each of the other antennae get connected to the measurement receiver channel in cycled (i.e., multiplexed) fashion. A phase comparator circuit (PCC), measures the phase difference between the reference channel and each measurement channel. The position tracking system also includes an analog-to digital converter (ADC) and a data processor for position calculation and data (message) processing. A receiver channel may include the data processor depending on application needs. For example, in a game console application, manufacturers may want data processing (with position calculation) to occur in the console processor which would allow the receiver channel to end at the ADC circuit. Other embodiments can have multiple measurement receiver channels.

Also, by connecting two or more of the receiver antennae to one receiver channel, there may be a cost savings in hardware and a reduction in the amount of circuit board space required by the position tracking system. Additionally, switching the reference between the multiple measurement antennae can improve the immunity of the tracking system to multipath. For instance, for a 3D position calculation, a minimum of four antennae are required. If two additional antennae (total of six) are added, then by cycling the reference receiver channel through five, instead of three, measurement receiver antennae, the position calculation can use two additional calculation points to determine the position of the tracked device. Even in the presence of multipath, additional antennae can provide additional measurements to improve the robustness of the 3D position calculation should multipath affect one or two of the other antennae measurements.

In one embodiment, the tracking system has two receiver channels, one receiver channel is used for N−1 out of N receiver antennae, and the other receiver channel is used as a reference channel and uses the Nth (one antenna). To enable this feature, a first multiplexing switch circuit allows the receiver channel to multiplex between each measurement receiver antennae and a second multiplexing switch circuit selects one of the receiver antennae to act as the reference. Implementation of this feature entails a printed circuit board (PCB) layout with careful impedance matching of amplifiers, switches, and antennae. The selection as to which receiver antennae to connect in each multiplexing switch may be under the control of the data processor. The data processor can ensure that the two receiver channels are connected to two mutually exclusive sets of antennae, and programs the sequence and timing at which the antennae are switched between the receiver channels.

FIG. 1 shows an embodiment of a wireless position tracking system 10 for tracking the position of an RF transmitter (i.e., tracked device) 12. The tracked device 12 may be carried by, attached to, embedded in an object whose position (x, y, z) is to be dynamically determined, and may be part of a transceiver or transducer. Examples of such objects include, but are not limited to, game controllers, TV remote control devices, mobile smart phones, laptop computers, and electronic tablets. The position tracking system 10 includes a receiver network 14 comprised of at least four receiver antennae 16-1, 16-2, 16-3, and 16-4 (generally, 16), whose relative positions ($X_i$, $Y_i$, $Z_i$, where i corresponds to the number of a particular antenna) are known. At least four receiver antennae 14 are required for determining the three-dimensional position of the tracked device 12 within the tracking environment.

The position tracking system 10 further includes a receiver channel unit 18 and a data processor 20. The receiver channel unit 18 includes multiple receiver channels, one of which is used as a reference receiver channel, each of which, under the control of the data processor 20, can dynamically switch its connections among the various receiver antennae 16, as described in more detail below. In position tracking system 10, the received RF signal is sent to the receiver channel unit 18, and the data obtained from receiver channel unit 18 is sent to the data processor 20 to calculate the (x, y, z) position of the tracked device 12, for subsequent display on a computer screen or for other software applications to use.

Figure 2:
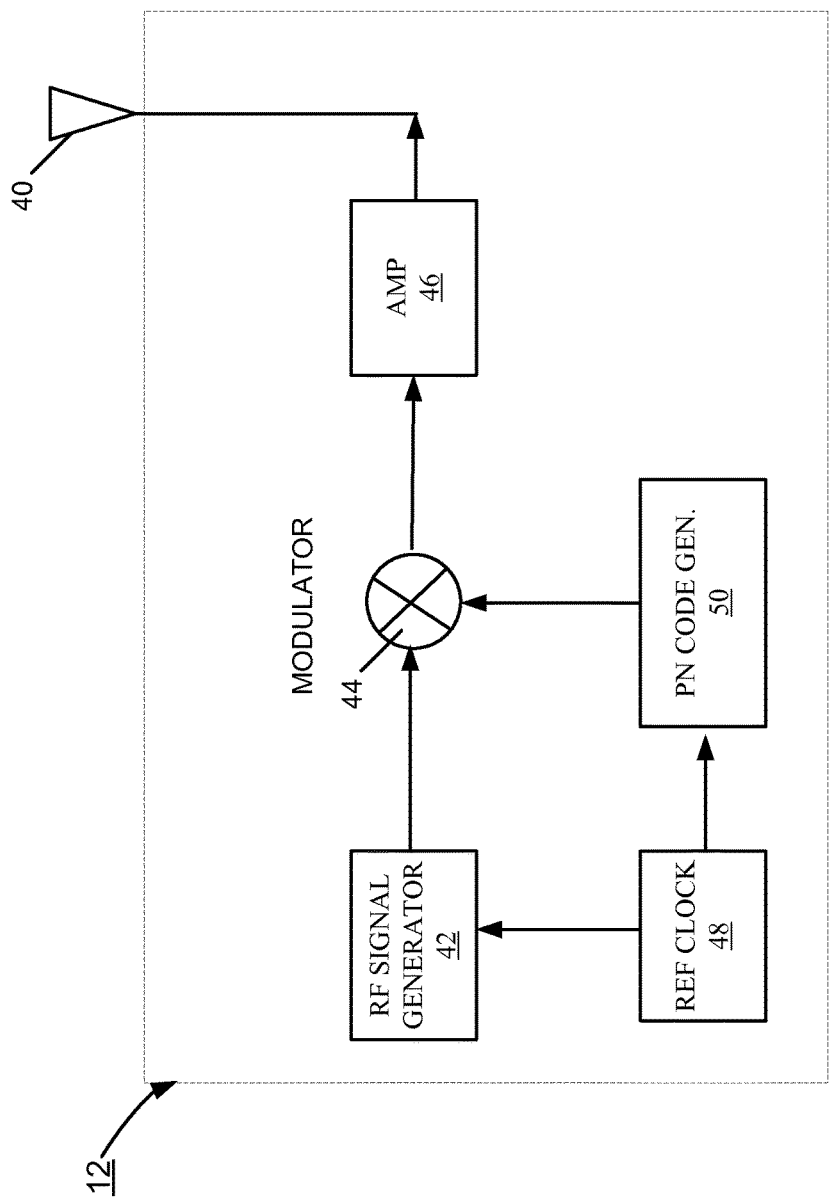
FIG. 2 is a block diagram of an embodiment of an RF transmitter that may be carried by, attached to, or embedded in an object.

FIG. 2 shows an embodiment of an RF transmitter 12, including an antenna 40, a RF signal generator 42, a modulator 44, an amplifier 46, a reference oscillator 48 and a pseudo-noise (PN) code generator 50. The RF transmitter 12 associated with an object has a PN code generator 50 that generates PN signals intrinsic to the object. The reference oscillator 48 provides a stable reference oscillator signal for the PN code generator 50 and RF signal generator 42. Reference oscillator 48 uses a phase lock loop to generate a stable RF signal. The modulator 44 provides a modulated signal to be transmitted. The modulated signal is then transmitted via amplifier 46 and transmitter antenna 40. In one embodiment, the carrier frequency is 2.4 GHz and the PN code chip rate is 80 MHz. The carrier frequency can operate in any other frequency and the PN code chip rate can also be set at other rates.

Figure 3:
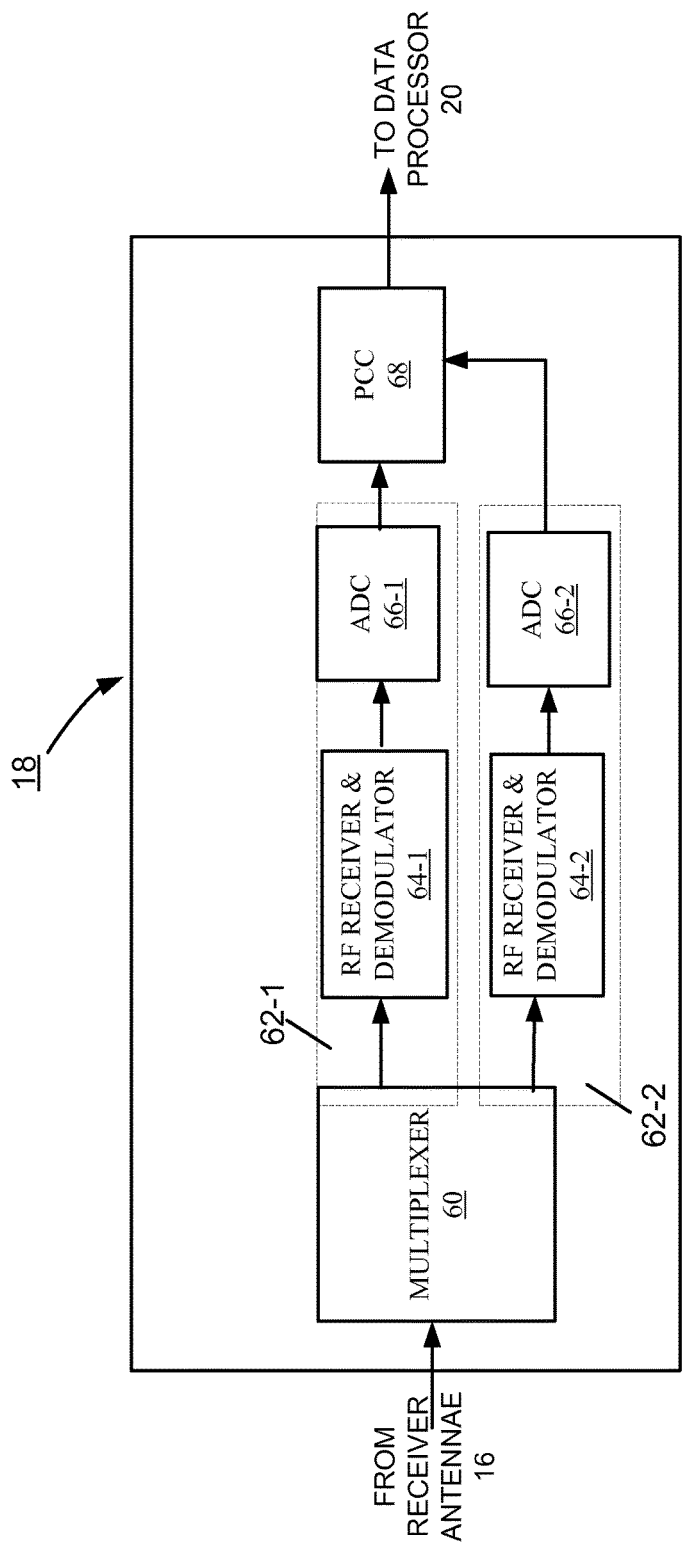
FIG. 3 is a block diagram of an embodiment of a multiplexed receiver channel unit.

FIG. 3 shows an embodiment of the receiver channel unit 18 that is equipped to multiplex or switch between all four antennae 16. The receiver channel unit 18 includes a multiplexing switch (MUX) 60 in communication with a plurality of receiver channels 62-1, 62-2 (generally, 62). One of the receiver channels (here, for example, receiver channel 62-2) acts as a measurement receiver channel and the other as a reference receiver channel. Each receiver channel 62-1, 62-2 includes a RF receiver and demodulator circuit 64-1, 64-2, respectively. The RF receiver and demodulator circuits 64-1, 64-2 demodulate the received measurement signal and the reference signal, respectively, as selected by the MUX 60.

The receiver channel unit 18 also includes analog-to-digital converter (ADC) circuits 66-1, 66-2 (generally, 66) and a phase comparator circuit (PCC) 68. The demodulated measurement signal passes to the ADC circuit 66-1, which converts the measurement signal into digital form. The demodulated reference signal passes to the ADC circuit 66-2, which converts the reference signal into digital form. The digital measurement and reference signals pass to the PCC 68, which recovers the carrier signal and modulated signal from each of the signals, and measures the phase differences between the RF signals arriving on the receiver antennae and the reference antenna. For example, if receiver antenna 16-1 (FIG. 1) is the reference, then the PCC 68 measures the phase differences of the carrier frequency between receiver antenna 16-2 and the reference antenna 16-1, receiver antenna 16-3 and the reference antenna 16-1, and receiver antenna 16-4 and the reference the reference antenna 16-1. The data processor 20 calculates the position of the tracked device 12 from the phase differences of each receiver antenna 16-2, 16-3, and 16-4 and the reference antenna 16-1, and the known physical positions of each receiver antenna 16-1, 16-2, 16-3, and 16-4 through simple triangulation. In this embodiment, this receiver channel unit 18 (with multiplexed measurement channel and cyclic reference channel) is connected to an external data processor 20. Notwithstanding, the data processor 20 can instead be part of the receiver channel unit 18.

Figure 4:
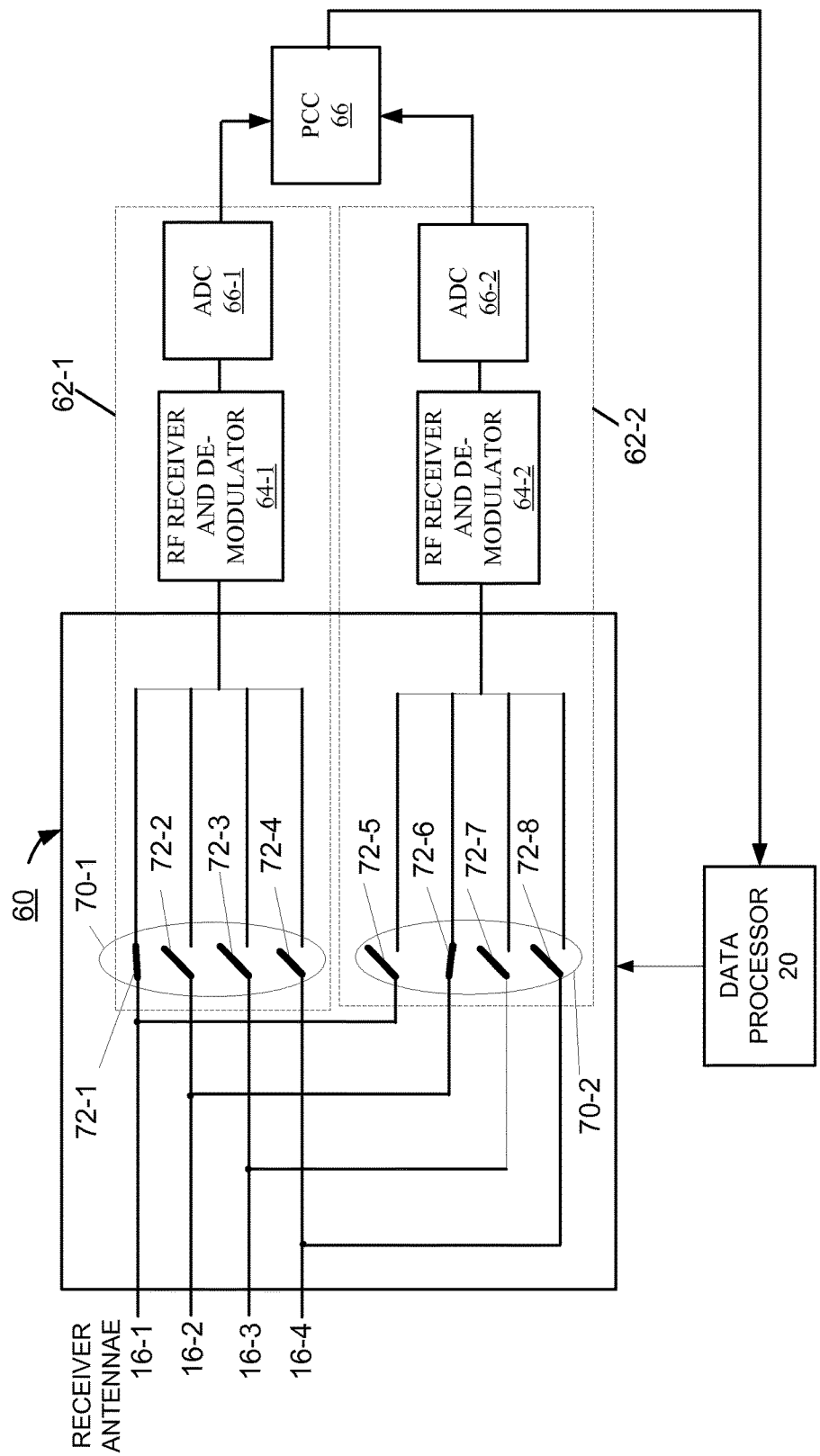
FIG. 4 is an expanded block diagram of the multiplexer receiver channel unit from FIG. 3.

FIG. 4 shows an embodiment of the MUX 60 of FIG. 3. The MUX 60 enables the cycling of the measurement antennae with the same reference receiver channel. The MUX 60 includes a first set 70-1 of four switches 72-1, 72-2, 72-3, 72-4 and a second set 70-2 of four switches 72-5, 72-6, 72-7, 72-8. Each set 70-1, 70-2 (generally, 70) has four switches (generally, 72). Each switch 72 of the first set 70-1, when closed, couples a different one of the receiver antennae 16 to the measurement receiver channel 62-1. For example, in FIG. 4, switch 72-1 is closed, while the other three switches 72-2, 72-3, 72-4 in the set 70-1 are open. Accordingly, the receiver antenna 16-1 is connected to the measurement receiver channel 62-1; RF signals arriving on the receiver antenna 16-1 pass through the switch 72-1 to the RF receiver and demodulator 64-1.

Each switch 72 of the second set 70-2, when closed, couples a different one of the receiver antennae 16 to the reference receiver channel 62-2. In this example, the second set 70-2 of switches determines which one of the four receiver antennae 16 serves as the reference receiver antenna. For example, in FIG. 4, switch 72-6 is closed, while the other three switches 72-5, 72-7, and 72-8 are open; accordingly, the receiver antenna 16-2 is the reference receiver antenna, and is connected to the receiver channel 62-2 (in this example, the reference receiver channel). RF signals arriving on the reference receiver antenna 16-2 pass through the switch 72-6 to the RF receiver and demodulator 64-2.

The data processor 20, or some other form of fixed or programmable control, controls the second set 70-2 of switches 72 to select the reference receiver antenna. In addition, the data processor 20, or some other form of fixed or programmable control, controls the first set 70-1 of switches, cycling through each of the other switches (that is, opening and closing the other switches in a sequential order), while keeping open the switch connected to the reference receiver antenna. This cycling through each of the other switches enables the RF signals arriving on the other receiver antennae to pass to the demodulator 64-1 of the measurement receiver channel 62-1 for subsequent comparison with the RF signals arriving on the reference receiver antenna by the PCC 68.

In one embodiment, the data processor 20 calculates the position of the tracked device 12 by using basic equations with known relative three-dimensional positions of the receiver antennae 16. To solve these equations, the data processor 20 uses the phase difference information received from the PCC 68. An example of the tracking equations, where the subscript 1 represents the reference receiver antenna, and subscripts 2, 3, and 4 represent the other receiver antennae, is below:

$$f_1 = \sqrt{(x_2-x)^2+(y_2-y)^2+(z_2-z)^2} - \sqrt{(x_1-x)^2+(y_1-y)^2+(z_1-z)^2} \quad \text{(Eq. 1)}$$

$$f_2 = \sqrt{(x_3-x)^2+(y_3-y)^2+(z_3-z)^2} - \sqrt{(x_1-x)^2+(y_1-y)^2+(z_1-z)^2} \quad \text{(Eq. 2)}$$

$$f_3 = \sqrt{(x_4-x)^2+(y_4-y)^2+(z_4-z)^2} - \sqrt{(x_1-x)^2+(y_1-y)^2+(z_1-z)^2} \quad \text{(Eq. 3)}$$

where $(x_i, y_i, z_i, i=1, 2, 3, 4)$ are the known positions of the receiver antennae 16 and $(x, y, z)$ is the position of the tracked device 12 to be computed. $f_1$, $f_2$, and $f_3$ are the measured differences in distance calculated from the phase differences, respectively, between receiver antennae 1 and 2, receiver antennae 1 and 3, and receiver antennae 1 and 4. These equations can be solved using a Kalman filter, a least squares minimization algorithm, or other linear algebra techniques to calculate the $(x, y, z)$ position of the tracked device. Although only one measurement receiver channel 62-1 is described, other embodiments of the MUX 60 can have multiple measurement receiver channels.

Figure 5:
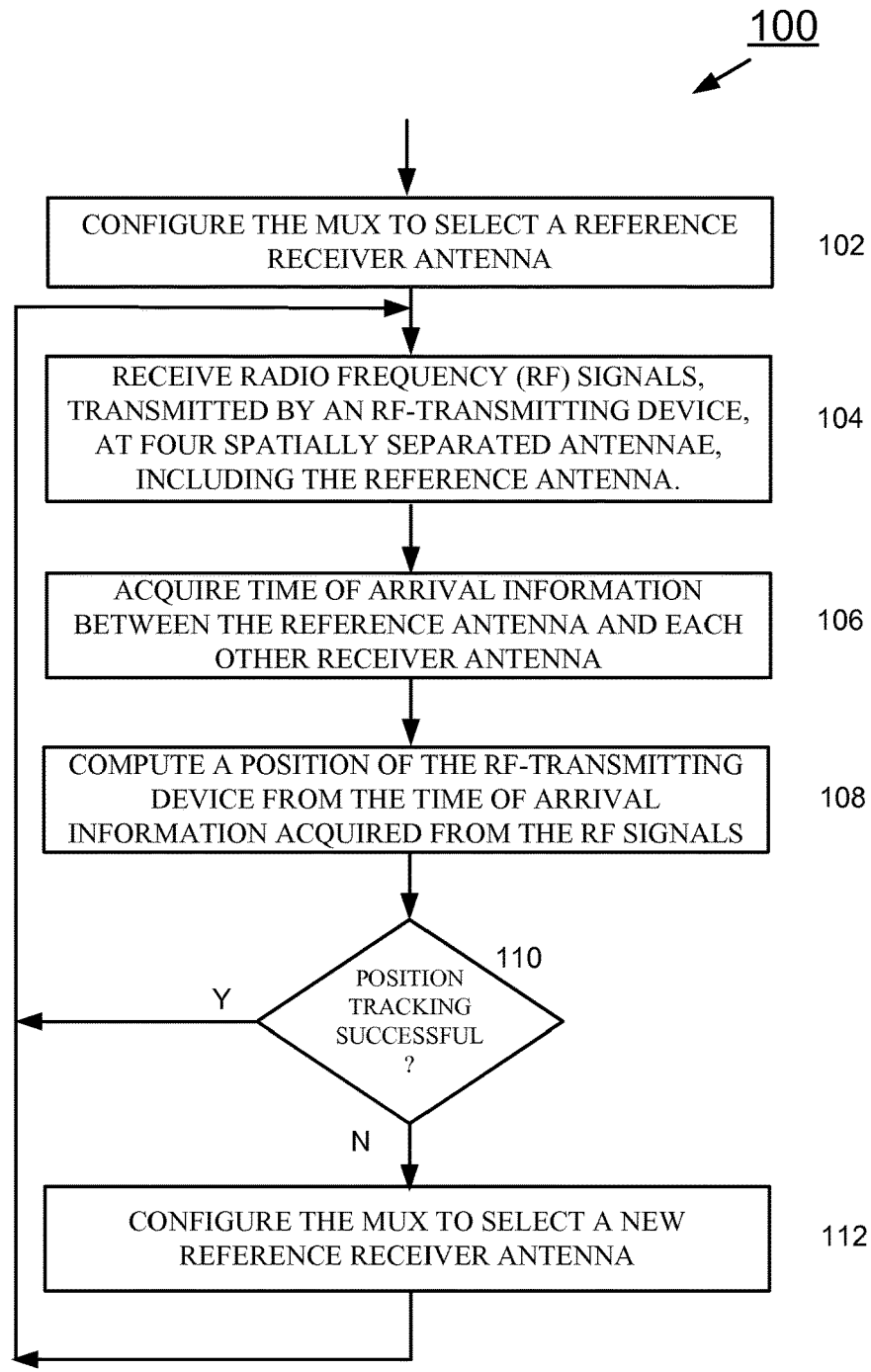
FIG. 5 is an embodiment of a process for tracking a position of an RF transmitter.

FIG. 5 shows an embodiment of a process 100 for tracking the position of a tracked device 12. In the description of the process, reference is made to elements of FIG. 1 and FIG. 4. The data processor 20 selects one of the receiver antennae 16 as the current reference receiver antenna and configures (step 102) the two sets 70 of switches 72 of the MUX 60, accordingly. For example, consider for illustration purposes that the receiver channel 16-2 is the reference receiver channel and the receiver antenna 16-4 is the selected reference receiver antenna; in this instance, the data processor 20 closes the switch 72-8 in order to pass RF signals received by the reference receiver antenna 16-4 through the reference receiver channel 16-2. The data processor 20 also closes (step 104) one of the switches of the first set 70-1 (switch 72-4 being exempted, because switch 72-4 is currently connected to the selected reference receiver antenna). For purposes of illustration, consider that the data processor 20 closes switch 72-1 to connect the receiver antenna 16-1 to the common receiver channel 62-1.

The four receiver antennae 16 receive (step 104) radio frequency (RF) signals transmitted by the tracked device 12. From the receive RF signals, time of arrival information (or phase difference information) is acquired (step 106) between the reference antenna (initially chosen to be receiver antenna 16-4) and each other receiver antenna. To acquire the time of arrival information, the PCC 68 determines the phase difference between RF signals received by the presently select receiver antenna 16-1 and reference receiver antenna 16-4. The data processor 20 then opens the switch 72-1 and closes the switch 72-2 to connect the receiver antenna 16-2 to the common receiver channel 62-1. Time of arrival information (or phase difference information) is acquired from the RF signals received by the receiver antenna 16-2 and reference receiver antenna 16-4. The data processor 20 then opens switch 72-2 and closes switch 72-3 to connect the receiver antenna 16-3 to the common receiver channel 62-1. Time of arrival information (or phase difference information) is then acquired from the RF signals received by the receiver antenna 16-3 and the reference receiver antenna 16-4. The data processor 20 cycles continuously through the first set 70-1 of switches (except the one connected to the reference antenna), while computing (step 108) the current position of the tracked device 12 from the time of arrival information between the reference receiver antenna and each other receiver antenna.

The process 100 continues to the track position of the tracking device for as long as the position tracking remains (step 110) successful. If the position tracking fails, for example, because the RF signals are blocked from reaching the current reference receiver antenna through an obstruction blocking the direct path between the tracked device and the tracking antenna, because signals sent from the tracked device and received at the tracking antennae are too weak, or because of the presence of multipath, the data processor 20 can select (step 112) one of the other receiver antenna as the new reference receiver antenna. For example, consider that the new selected reference receiver antenna is receiver antenna 16-3. Subsequently, the data processor 20 ensures that the switch 72-3 connected to the new reference receiver antenna remains open throughout the cycling of the other switches 72-1, 72-2, and 72-4 of the first set 70-1.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A position tracking system for tracking a physical (x, y, z) position of a radio-frequency (RF) transmitter, the position tracking system comprising:
    at least four RF receiver antennae disposed at known locations, each of the RF receiver antennae receiving RF signals from an RF transmitter, one of the at least four RF receiver antennae being used as a reference RF receiver antenna;
    a receiver channel unit in communication with the at least four RF receiver antennae, the receiver channel unit comprising a plurality of receiver channels including a reference receiver channel and a measurement receiver channel, each RF receiver antenna of the at least four RF receiver antennae being in communication with the reference receiver channel and with the measurement receiver channel, the receiver channel unit further comprising a multiplexer dynamically configurable to selectively connect any one of the at least four RF receiver antennae to the reference receiver channel to be the reference RF receiver antenna, and to connect, in succession, each of the other RF receiver antennae of the at least four RF receiver antennae to the measurement receiver channel to be a measurement RF receiver antenna, the receiver channel unit further comprising a comparator circuit for measuring phase differences between the RF signals received by the reference RF receiver antenna and the RF signals received by each of the other RF receiver antennae when that other RF receiver antenna is currently the measurement RF receiver antenna; and
    a data processor computing the physical (x, y, z) position of the RF transmitter from the phase differences measured by the comparator circuit and the known locations of the at least four RF receiver antennae, x, y, and z being spatial coordinates in three-dimensional space.

2. The position tracking system of claim 1, wherein the multiplexer is dynamically configurable to connect the reference receiver channel to a different one of the at least four RF receiver antennae, to select thereby a new reference RF receiver antenna.

3. The position tracking system of claim 1, wherein the multiplexer includes a first switching circuit and a second switching circuit, the first switching circuit being adapted to connect any one of the at least four RF receiver antennae to the measurement receiver channel, and the second switching circuit being adapted to connect any one of the at least four RF receiver antennae to the reference receiver channel.

4. The position tracking system of claim 3, wherein the data processor is in communication with the multiplexer to cause the first switching circuit to connect in succession each of the other RF receiver antenna of the at least four RF receiver antennae to the measurement receiver channel, while the second switching circuit connects the reference RF receiver antenna to the reference receiver channel.

5. The position tracking system of claim 1, wherein the data processor is in communication with the multiplexer to control which of the at least four RF receiver antennae the multiplexer connects to the reference receiver channel.

6. The position tracking system of claim 1, wherein the comparator circuit computes a time difference of arrival between RF signals received by the reference RF receiver antenna and RF signals received by each of the other RF receiver antennae based on the measured phase differences and forwards the time difference of arrival computations to the data processor for computation of the physical (x, y, z) position of the RF transmitter.

7. The position tracking system of claim 1, wherein the receiver channel unit comprises the data processor.

8. A radio-frequency (RF) receiver channel unit for tracking a physical (x, y, z) position of an RF transmitter, the RF receiver channel unit comprising:
    a reference receiver channel including an RF receiver and demodulator, the reference receiver channel being in communication with at least four RF receiver antennae;
    a measurement receiver channel including an RF receiver and demodulator, the measurement receiver channel being in communication with the at least four RF receiver antennae that are in communication with the reference receiver channel;
    a multiplexer dynamically configurable to selectively connect any one of the at least four RF receiver antennae to the reference receiver channel to be a reference RF receiver antenna and to connect, in succession, each of the other RF receiver antennae of the at least four RF receiver antennae to the measurement receiver channel to be a measurement RF receiver antenna, wherein the RF receiver and demodulator of the reference receiver channel receives and demodulates RF signals transmitted by the RF transmitter and received by the reference RF receiver antenna, and wherein the RF receiver and demodulator of the measurement receiver channel, in succession, receives and demodulates RF signals transmitted by the RF transmitter and received by each of the other RF receiver antennae of the at least four RF receiver antennae when that other RF receiver antenna is currently the measurement RF receiver antenna; and
    a comparator circuit measuring phase differences between the RF signals received by the reference RF receiver antenna and the RF signals received by each of the other RF receiver antennae when that other RF receiver antenna is currently the measurement RF receiver antenna.

9. The RF receiver channel unit of claim 8, further comprising a data processor computing the physical (x, y, z) position of the RF transmitter from the phase differences measured by the comparator circuit and known locations of the at least four RF receiver antennae, x, y, z being spatial coordinates in three-dimensional space.

10. The RF receiver channel unit of claim 8, wherein the multiplexer is dynamically configurable to connect the reference receiver channel to any of the other RF receiver antennae of the at least four RF receiver antennae, to select thereby a new reference RF receiver antenna.

11. The RF receiver channel unit of claim 9, wherein the multiplexer includes a first switching circuit and a second switching circuit, the first switching circuit being adapted to connect any one of the at least four RF receiver antennae to the measurement receiver channel, and the second switching circuit being adapted to connect any one of the at least four RF receiver antennae to the reference receiver channel.

12. The RF receiver channel unit of claim 11, wherein the data processor communicates with the multiplexer to cause the first switching circuit to connect, one at a time, each of the other RF receiver antennae of the at least four RF receiver antennae to the measurement receiver channel, while the second switching circuit connects the reference receiver antenna to the reference receiver channel.

13. The RF receiver channel unit of claim 9, wherein the data processor is in communication with the multiplexer to control which of the at least four RF receiver antennae the multiplexer connects to the reference receiver channel.

14. The RF receiver channel unit of claim 9, wherein the comparator circuit computes a time difference of arrival between the RF signals received by the reference RF receiver antenna and the RF signals received by each of the other RF receiver antenna of the at least four RF receiver antennae based on the measured phase differences and forwards the time difference of arrival computations to the data processor for computation of the physical (x, y, z) position of the RF transmitter.

15. A method for tracking a physical (x, y, z) position of a radio-frequency (RF) transmitter, the method comprising:
receiving RF signals from an RF transmitter by at least four RF receiver antennae that are disposed at known locations and are in communication with both a reference receiver channel and a measurement receiver channel;
dynamically selecting any one of the at least four RF receiver antennae as a reference RF receiver antenna;
connecting the selected reference RF receiver antenna to the reference receiver channel;
connecting, one at a time, each of the other RF receiver antennae of the at least four RF receiver antennae to the measurement receiver channel while connecting the selected reference RF receiver antenna to the reference receiver channel;
measuring phase differences between the RF signals received by the reference RF receiver antenna and the RF signals received by each of the other RF receiver antennae of the at least four RF receiver antennae; and
computing the physical (x, y, z) position of the RF transmitter from the measured phase differences and the known locations of the at least four RF receiver antennae, x, y, z being spatial coordinates in three-dimensional space.

16. The method of claim 15, further comprising dynamically selecting a new reference RF receiver antenna by disconnecting the selected reference RF receiver antenna from the reference receiver channel and connecting any of the other RF receiver antennae of the at least four RF receiver antennae to the reference receiver channel.

17. The method of claim 15, further comprising controlling a multiplexer to select which of the at least four RF receiver antennae connects to the reference receiver channel.

18. The method of claim 15, further comprising computing a time difference of arrival between the RF signals received by the reference RF receiver antenna and the RF signals received by each of the other RF receiver antennae based on the measured phase differences and forwarding the time difference of arrival computations to a data processor for computation of the physical (x, y, z) position of the RF transmitter.

* * * * *